United States Patent
Lee et al.

(10) Patent No.: US 11,395,315 B2
(45) Date of Patent: Jul. 19, 2022

(54) METHOD FOR TRANSMITTING OR RECEIVING SIGNAL IN WIRELESS COMMUNICATION SYSTEM AND DEVICE THEREFOR

(71) Applicant: LG Electronics Inc., Seoul (KR)

(72) Inventors: Hyunho Lee, Seoul (KR); Kyuhwan Kwak, Seoul (KR); Seungmin Lee, Seoul (KR); Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/825,217

(22) Filed: Mar. 20, 2020

(65) Prior Publication Data

US 2020/0221474 A1 Jul. 9, 2020

Related U.S. Application Data

(63) Continuation of application No. PCT/KR2019/001498, filed on Feb. 7, 2019.

(Continued)

(51) Int. Cl.
*H04W 72/12* (2009.01)
*H04L 1/16* (2006.01)
(Continued)

(52) U.S. Cl.
CPC ....... *H04W 72/1257* (2013.01); *H04L 1/1664* (2013.01); *H04L 5/0082* (2013.01);
(Continued)

(58) Field of Classification Search
None
See application file for complete search history.

(56) References Cited

U.S. PATENT DOCUMENTS

| | | |
|---|---|---|
| 2010/0182973 A1 | 7/2010 | Kim et al. |
| 2011/0103327 A1 | 5/2011 | Lee et al. |
| | (Continued) | |

FOREIGN PATENT DOCUMENTS

| | | |
|---|---|---|
| JP | 2016540456 | 12/2016 |
| JP | 2017539124 | 12/2017 |
| | (Continued) | |

OTHER PUBLICATIONS

International Search Report in International Appln. No. PCT/KR2019/001498, dated Jun. 3, 2019, 21 pages (with English translation).

(Continued)

*Primary Examiner* — Jenkey Van
(74) *Attorney, Agent, or Firm* — Fish & Richardson P.C.

(57) ABSTRACT

A method for a terminal transmitting a signal in a wireless communication system, according to one embodiment of the present invention, comprises the steps of: receiving, from a base station, a semi-persistent scheduling (SPS) configuration for SPS-based uplink signal repetition; and, on the basis of the SPS configuration, repeatedly transmitting a first SPS uplink signal to the base station, wherein, in a state where the repetition of the first SPS uplink signal is in progress, and a time resource of the first SPS uplink signal and a time resource of a second SPS uplink signal overlap, a terminal may continue with the repetition of the first SPS uplink signal in progress, without the transmission of the second SPS uplink signal.

15 Claims, 10 Drawing Sheets

Related U.S. Application Data

(60) Provisional application No. 62/675,668, filed on May 23, 2018, provisional application No. 62/628,284, filed on Feb. 9, 2018, provisional application No. 62/627,697, filed on Feb. 7, 2018.

(51) Int. Cl.
*H04L 5/00* (2006.01)
*H04W 72/04* (2009.01)
*H04W 72/14* (2009.01)

(52) U.S. Cl.
CPC ... *H04W 72/0413* (2013.01); *H04W 72/0446* (2013.01); *H04W 72/14* (2013.01)

(56) References Cited

U.S. PATENT DOCUMENTS

| | | | |
|---|---|---|---|
| 2015/0098371 A1 | 4/2015 | Vajapeyam et al. | |
| 2017/0026942 A1* | 1/2017 | Vajapeyam | H04W 72/0446 |
| 2017/0303302 A1* | 10/2017 | Bagheri | H04W 72/1284 |
| 2018/0049229 A1* | 2/2018 | Dinan | H04L 1/1896 |
| 2018/0092122 A1* | 3/2018 | Babaei | H04W 72/14 |
| 2019/0207737 A1* | 7/2019 | Babaei | H04B 7/0626 |
| 2019/0215781 A1* | 7/2019 | Jeon | H04W 24/10 |
| 2019/0230683 A1* | 7/2019 | Akkarakaran | H04L 5/0064 |
| 2021/0185717 A1* | 6/2021 | Dudda | H04W 72/1289 |

FOREIGN PATENT DOCUMENTS

| | | |
|---|---|---|
| KR | 20110073334 | 6/2011 |
| KR | 20130109164 | 10/2013 |
| KR | 20150117650 | 10/2015 |
| KR | 20160085753 | 7/2016 |
| WO | WO2017078465 | 5/2017 |

OTHER PUBLICATIONS

3rd Generation Partnership Project, Fujitsu, "Discussions on HARQ for UL data transmission without grant," R1-1715490, 3GPP TSG RAN WG1, Nagoya, Japan, dated Sep. 18-21, 5 pages.

3rd Generation Partnership Project, LG Electronics, "Discussion on UL data transmission procedure," R1-1715888, 3GPP TSG RAN WG1, Nagoya, Japan, dated Sep. 18-21, 2017, 11 pages.

3rd Generation Partnership Project, Intel Corporation, "UL data transmission procedures in NR," R1-1717396, 3GPP TSG RAN WG1, Prague, Czech Republic, dated Oct. 9-13, 12 pages.

3rd Generation Partnership Project, vivo, "Remaining issues on UL data transmission procedure," R1-1800204, 3GPP TSG RAN WG1, Vancouver, Canada, dated Jan. 22-26, 2018, 5 pages.

3rd Generation Partnership Project, Nokia, Nokia Shanghai Bell, "Multiple UL SPS configuration collision handling," R2-1708592, 3GPP TSG-RAN WG2, Berlin, Germany, dated Aug. 21-25, 2017, 3 pages.

3rd Generation Partnership Project, Ericcson, "Handling Collisions Between Multiple SPS Configurations," R2-1709367, 3GPP TSG-RAN WG2, Berlin, Germany, dated Aug. 21-25, 2017, 2 pages.

3rd Generation Partnership Project, LG Electronics Inc., "Using multiple SPS on SCells," R2-1711571, 3GPP TSG-RAN WG2, Prague, Czech Republic, dated Oct. 9-13, 2017, 2 pages.

EP Supplementary European Search Report in European Appln. No. 19751417.7, dated Dec. 2, 2020, 8 pages.

IN Office Action in Indian Appln. No. 202027010712, dated Apr. 28, 2021, 6 pages (with English translation).

JP Office Action in Japanese Appln. No. 2020-527992, dated May 11, 2021, 7 pages (with English translation).

Nokia, Nokia Shanghai Bell, "On SPS operation for shorter TTI," R1-1719950, 3GPP TSG-RAN WG1 Meeting #91, Reno, Nevada (USA), dated Nov. 27-Dec. 1, 2017, 6 pages.

\* cited by examiner

METHOD FOR TRANSMITTING OR RECEIVING SIGNAL IN WIRELESS COMMUNICATION SYSTEM AND DEVICE THEREFOR

CROSS-REFERENCE TO RELATED APPLICATIONS

This application is a continuation of International Application No. PCT/KR2019/001498, filed on Feb. 7, 2019, which claims the benefit of U.S. Provisional Application No. 62/675,668, filed on May 23, 2018, U.S. Provisional Application No. 62/628,284, filed on Feb. 9, 2018, and U.S. Provisional Application No. 62/627,697, filed on Feb. 7, 2018. The disclosures of the prior applications are incorporated by reference in their entirety.

TECHNICAL FIELD

The present disclosure relates to a wireless communication system and, more particularly, to a method of transmitting or receiving an uplink signal by a user equipment (UE) and a base station (BS) and an apparatus therefor.

BACKGROUND

A long-term evolution (LTE) system basically supports downlink (DL)/uplink (UL) scheduling (simply, dynamic scheduling) through a dynamic DL/UL grant and also supports semi-persistent scheduling (SPS).

Dynamic scheduling transmits DL control information (DCI) over a physical downlink control channel (PDCCH) during every DL/UL transmission so that scheduling overhead relatively increases and scheduling flexibility is high.

SPS scheduling may be useful in the case in which a relatively small data packet, such as voice over Internet protocol (VoIP), is periodically transmitted. SPS scheduling is advantageous in that overhead decreases. After receiving a PDCCH scrambled with a SPS cell radio network temporary identifier (C-RNTI) to activate SPS scheduling, a UE may periodically transmit and receive an SPS signal to and from a BS without further receiving the PDCCH. To deactivate SPS scheduling, the UE may receive the PDCCH scrambled with the SPS C-RNTI and then end transmission and reception of the SPS signal.

Even in a state in which SPS scheduling is activated, the UE may monitor the PDCCH corresponding to dynamic scheduling. If SPS scheduling collides with dynamic scheduling, the UE conforms to dynamic scheduling.

SUMMARY

An object of the present disclosure is to provide a method of more efficiently and accurately transmitting and receiving an SPS-based UL signal by a UE and a BS and an apparatus therefor.

It is to be understood that both the foregoing general description and the following detailed description of the present disclosure are exemplary and explanatory and are intended to provide further explanation of the disclosure as claimed.

According to an aspect of the present disclosure, provided herein is a method of transmitting a signal by a user equipment (UE) in a wireless communication system. The method comprises: receiving a semi-persistent scheduling (SPS) configuration for SPS-based uplink (UL) signal repetition from a base station (BS); and repeatedly transmitting a first SPS UL signal to the BS based on the SPS configuration. In a state in which repetition of the first SPS UL signal is ongoing and in a state in which a time resource of the first SPS UL signal overlaps with a time resource of a second SPS UL signal, the UE may continue to perform the ongoing repetition of the first SPS UL signal without transmitting the second SPS UL signal.

In another aspect of the present disclosure, provided herein is a method of receiving a signal by a base station (BS) in a wireless communication system. The method comprises: transmitting a semi-persistent scheduling (SPS) configuration for SPS-based uplink (UL) signal repetition to a user equipment (UE); and repeatedly receiving a first SPS UL signal from the UE based on the SPS configuration. In a state in which repetition of the first SPS UL signal is ongoing and in a state in which a time resource of the first SPS UL signal overlaps with a time resource of a second SPS UL signal, the BS may continue to receive the ongoing repetition of the first SPS UL signal without receiving the second SPS UL signal.

In another aspect of the present disclosure, provided herein is a user equipment (UE) including a transceiver; and a processor configured to control the transceiver to receive a semi-persistent scheduling (SPS) configuration for SPS-based uplink (UL) signal repetition from a base station (BS) and repeatedly transmit a first SPS UL signal to the BS based on the SPS configuration. In a state in which repetition of the first SPS UL signal is ongoing and in a state in which a time resource of the first SPS UL signal overlaps with a time resource of a second SPS UL signal, the processor may continue to perform the ongoing repetition of the first SPS UL signal without transmitting the second SPS UL signal.

In the state in which the time resource of the first SPS UL signal overlaps with the time resource of the second SPS UL signal, the UE/BS may determine that the first SPS UL signal and the second SPS UL signal collide. The BS may expect that the UE will not transmit the second SPS UL signal.

Each of the first SPS UL signal and the second SPS UL signal may be an SPS physical uplink shared channel (PUSCH).

The repetition of the first SPS UL signal may be performed in units of a subframe, a slot, or a sub-slot.

The second SPS UL signal may be related to initial transmission.

In a state in which the time resource of the first SPS UL signal overlaps with a time resource of a dynamic UL grant-based third UL signal rather than an SPS-based signal, the UE/BS may stop repeating the first SPS UL signal and transmit/receive the third UL signal.

When the repetition of the first SPS UL signal is stopped, the UE/BS may transmit/receive, through the third UL signal or through an additional physical uplink control channel (PUCCH), uplink control information (UCI) which has been supposed to be transmitted/received through piggyback on the first SPS UL signal.

According to an embodiment of the present disclosure, since a DMRS is shared between periodically transmitted SPS PUSCH signals, radio resources can be more efficiently used. When the SPS PUSCH signals overlap with PUCCH signals, since a UE drops the PUCCH signals even if PUCCH-PUSCH simultaneous transmission is configured for the UE, power can be constantly maintained over the SPS PUSCH signals. As a result, transmission and reception of the SPS PUSCH signals can be more accurately performed between the UE and a BS.

It will be appreciated by persons skilled in the art that that the effects that could be achieved with the present disclosure are not limited to what has been particularly described hereinabove and other advantages of the present disclosure will be more clearly understood from the following detailed description.

BRIEF DESCRIPTION OF THE DRAWINGS

The accompanying drawings, which are included to provide a further understanding of the disclosure, illustrate embodiments of the disclosure and together with the description serve to explain the principle of the disclosure.

DETAILED DESCRIPTION

Figure 1A:
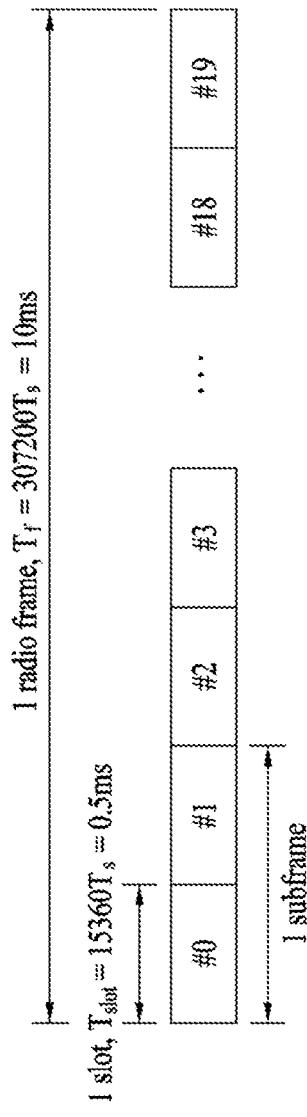
FIGS. 1A and 1B are diagrams showing an example of a radio frame structure used in a wireless communication system.

Reference will now be made in detail to the preferred embodiments of the present disclosure, examples of which are illustrated in the accompanying drawings. The accompanying drawings illustrate exemplary embodiments of the present disclosure and provide a more detailed description of the present disclosure. However, the scope of the present disclosure should not be limited thereto.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present disclosure, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. ABS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present disclosure, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlike a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present disclosure, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present disclosure with respect to a method of performing coordinated data transmission using some or all nodes can be applied to various types of multi-node systems. For example, a node refers to an antenna group spaced apart from another node by a predetermined distance or more, in general. However, embodiments of the present disclosure, which will be described below, can even be applied to a case in which a node refers to an arbitrary antenna group irrespective of node interval. In the case of an eNB including an X-pole (cross polarized) antenna, for example, the embodiments of the preset disclosure are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present disclosure, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present disclosure, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present disclosure, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

Figure 1B:
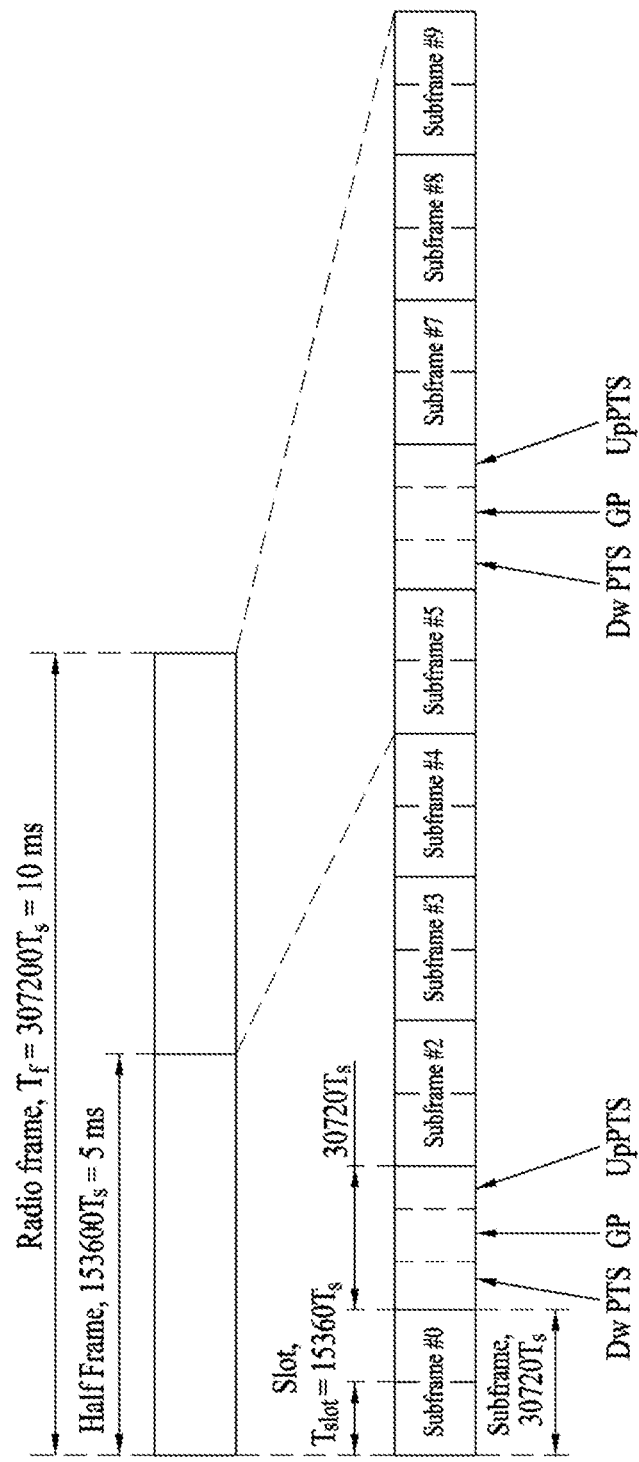

FIGS. 1A and 1B illustrate an exemplary radio frame structure used in a wireless communication system. FIG. 1A illustrates a frame structure for frequency division duplex (FDD) used in 3GPP LTE/LTE-A and FIG. 1B illustrates a frame structure for time division duplex (TDD) used in 3GPP LTE/LTE-A.

Referring to FIGS. 1A and 1B, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | *5120 · $T_s$ |
| 5 | 6592 · $T_s$ | 4384 · $T_s$ | *5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
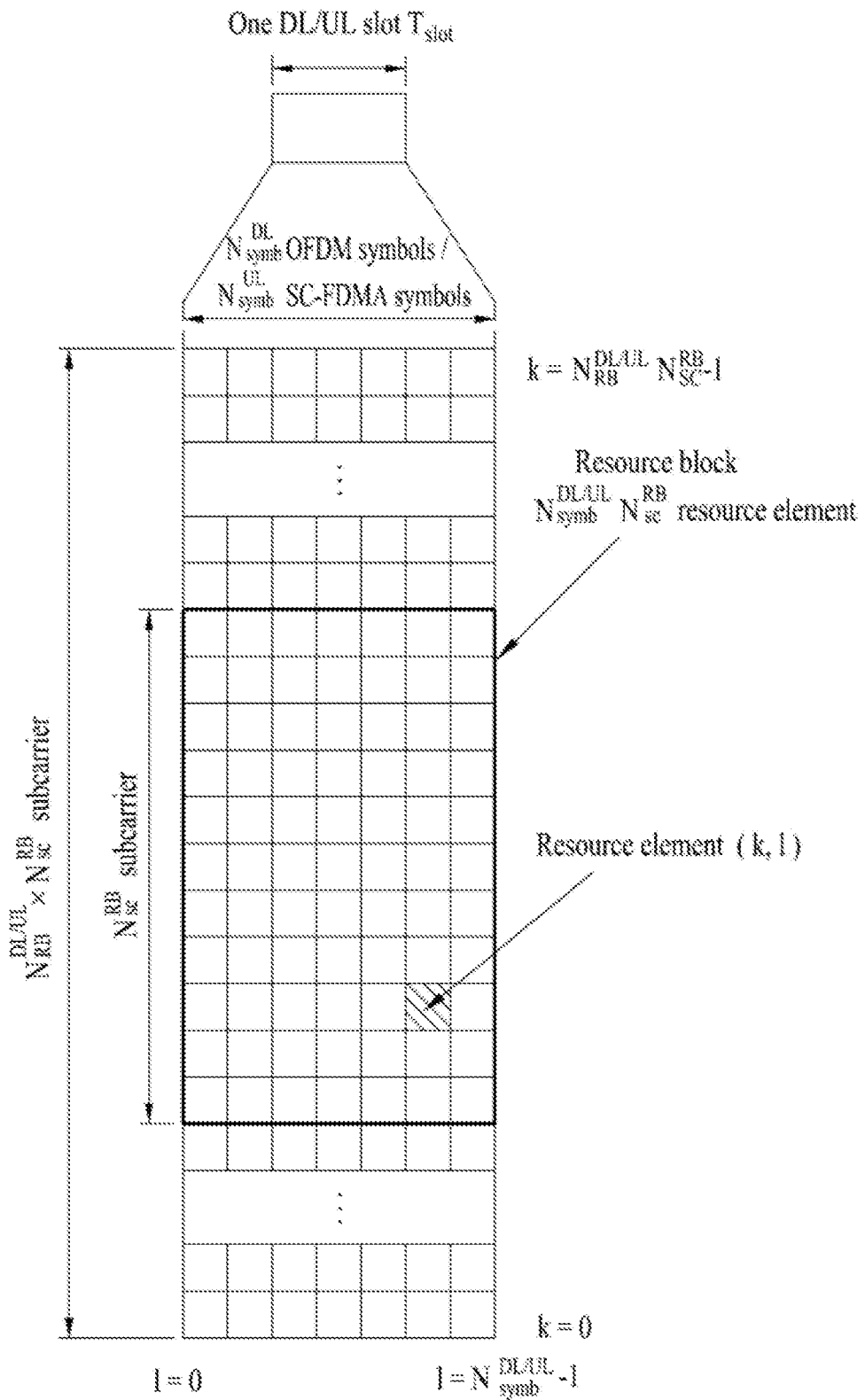
FIG. 2 is a diagram showing an example of a downlink/uplink (DL/UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present disclosure can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL} - 1$, and $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
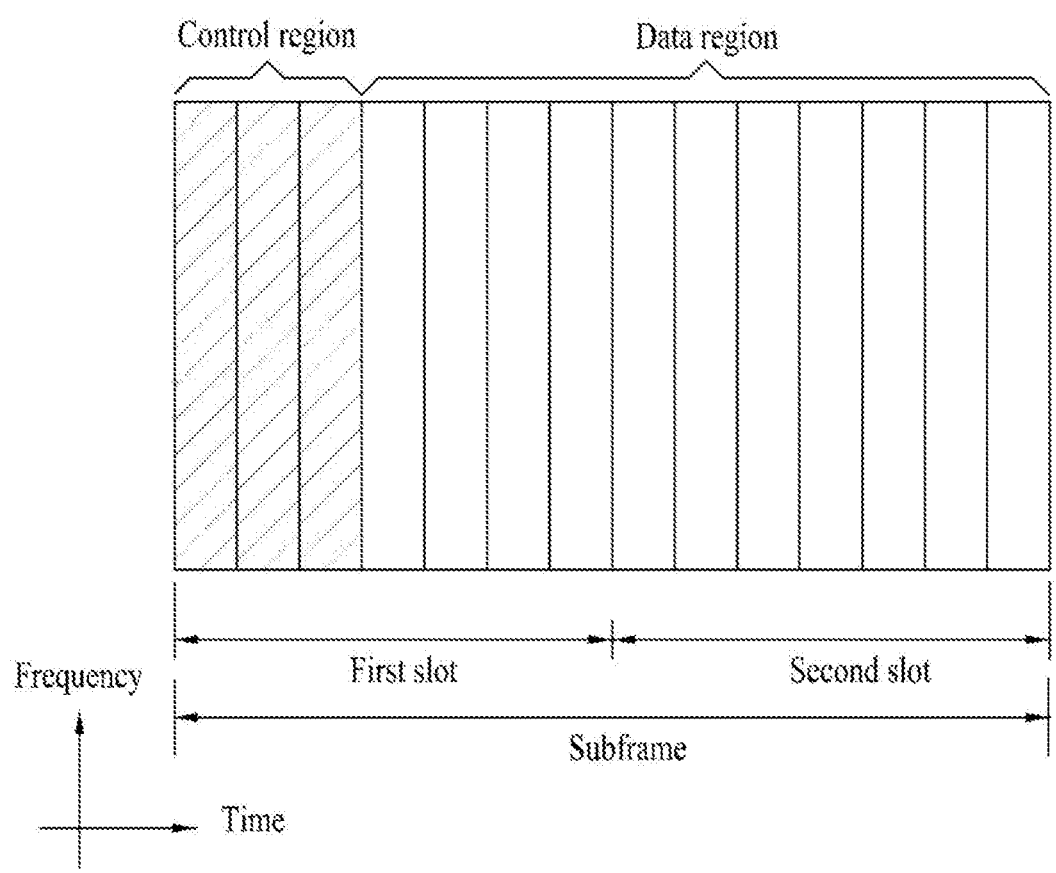
FIG. 3 is a diagram showing an example of a DL subframe structure used in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Type | Search Space $S_k^{(L)}$ Level L | Size[in CCEs] | Number of PDCCH candidates $M^{(L)}$ |
|---|---|---|---|
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
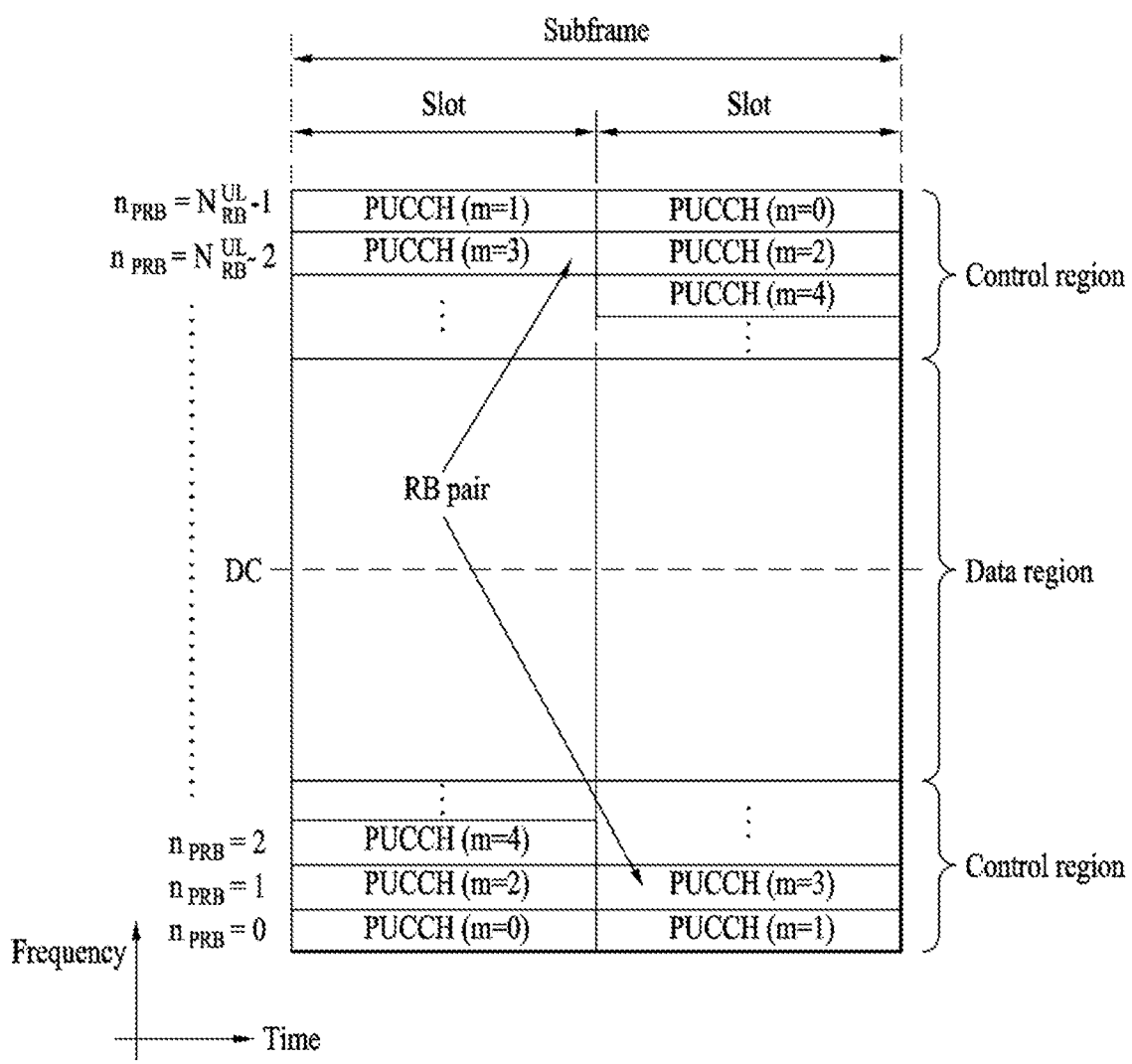
FIG. 4 is a diagram showing an example of a UL subframe structure used in a 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel

TABLE 4

| PUCCH format | Modulation scheme | Number of bits per subframe | Usage | Etc. |
|---|---|---|---|---|
| 1 | N/A | N/A (exist or absent) | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit AUK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

TTI(Transmission Time Interval)

Figure 5:
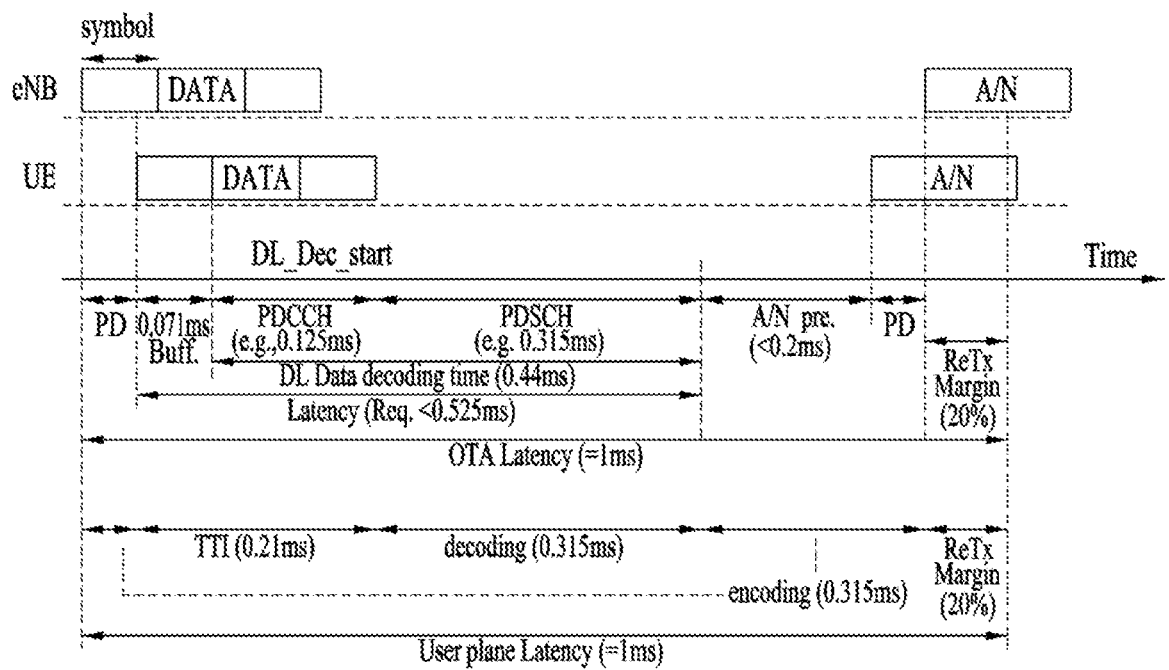
FIG. 5 is a diagram showing reduction in a TTI length according to reduction in user plane latency.

To satisfy the aforementioned reduction in latency, i.e., low latency, it may be required to reduce TTI that is a minimum unit of data transmission to newly design a shortened TTI (sTTI) of 0.5 msec or less. For example, as illustrated in FIG. 5, to shorten user plane (U-plane) latency to a time point when a UE completely transmits ACK/ NACK (A/N) from a time point when an eNB begins to transmit data (PDCCH and PDSCH) to 1 msec, a sTTI may be configured in units of about 3 OFDM symbols.

Figure 6:
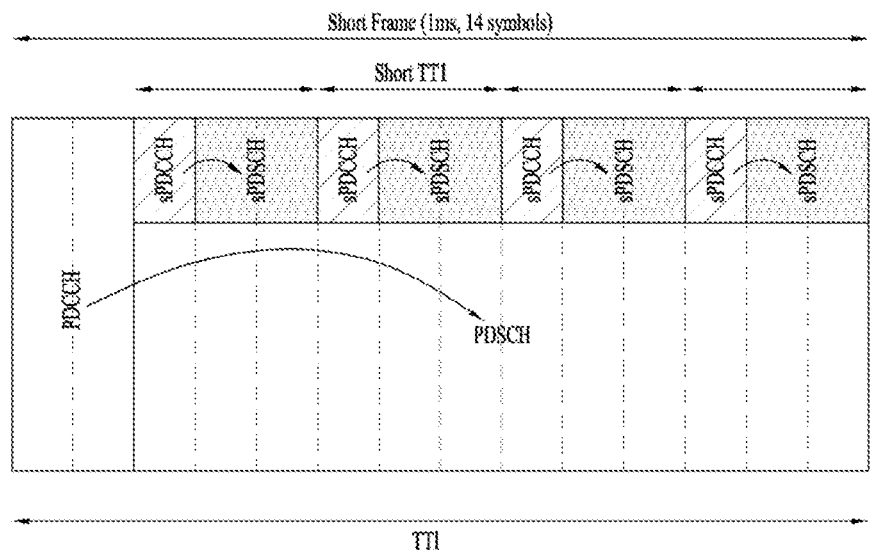
FIG. 6 is a diagram showing an example in which a plurality of short TTIs is set in one subframe.

In a DL environment, a PDCCH (i.e., sPDCCH) for data transmission/scheduling in such a sTTI and a PDSCH (i.e., sPDSCH) for transmission in the sTTI may be transmitted and, for example, as illustrated in FIG. 6, a plurality of sTTIs may be configured using different OFDM symbols in one subframe. Particularly, OFDM symbols included in the sTTI may be configured by excluding OFDM symbols transmitted by legacy control channels. The sPDCCH and the sPDSCH may be transmitted in the sTTI in the form of time division multiplexing (TDM) using different OFDM symbol regions and may be transmitted in the form of frequency division multiplexing (FDM) using different PRB domain/ frequency resources.

In a UL environment as similar with the DL environment, data transmission/scheduling in a sTTI is allowed, channels corresponding to a legacy TTI based PUCCH and PUSCH are referred to as sPUCCH and sPUSCH, respectively.

Figure 7A:
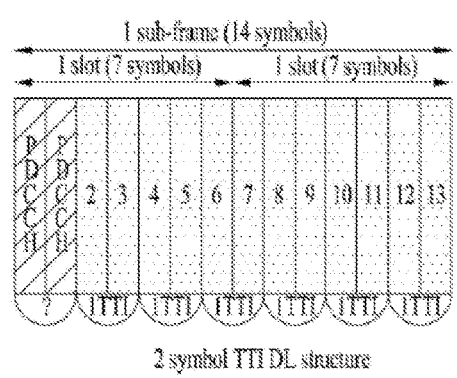
FIGS. 7A to 7D are diagrams showing a DL subframe structure including a short TTI with a plurality of lengths (symbol numbers).
Figure 7B:
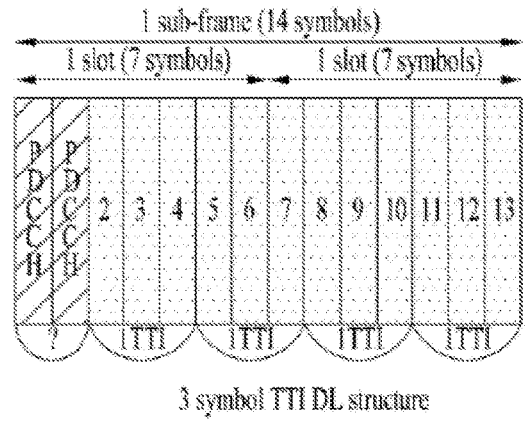
Figure 7C:
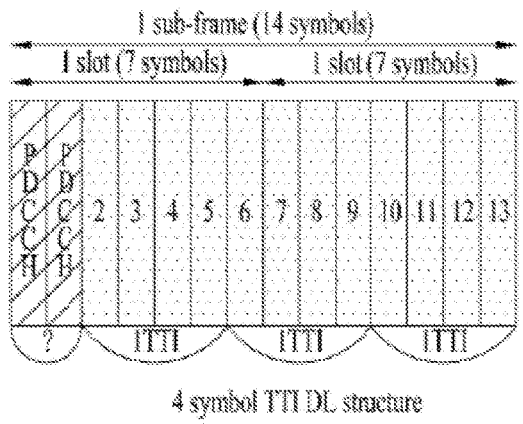

In the specification, the present disclosure is described below in terms of an LTE/LTE-A system. In an existing LTE/LTE-A, when having a normal CP, a subframe of 1 ms may include 14 OFDM symbols and, when a symbol is configured with a TTI in a shorter unit than 1 ms, a plurality of TTIs may be configured in one subframe. A method of configuring a plurality of TTIs may configure two symbols, three symbols, four symbols, and seven symbols as one TTI, as in an embodiment shown in FIGS. 7A to 7D below. Although not shown, the case in which one symbol is configured as a TTI may also be configured. When one symbol is one TTI unit, 12 TTIs may be generated on the assumption that a legacy PDCCH is transmitted in two OFDM symbols. Similarly, as shown in FIG. 7A, when two symbols correspond to one TTI unit, 6 TTIs may be generated, as shown in FIG. 7B, when three symbols correspond to one TTI unit, 4 TTIs may be generated and, as shown in FIG. 7C, when four symbols correspond to one TTI unit, 3 TTIs may be generated. Needless to say, in this case, first two OFDM symbols may be assumed to transmit a legacy PDCCH.

Figure 7D:
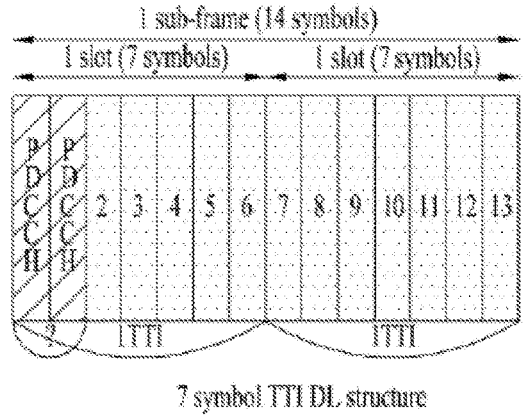

As shown in FIG. 7D, when seven symbols are configured with one TTI, one TTI of seven symbol units including a legacy PDCCH and seven subsequent symbols may be configured as one TTI. In this case, in the case of a UE that supports a sTTI, when one TTI includes seven symbols, it may be assumed that puncture or rate-matching is performed on two OFDM symbols positioned at a fore end for transmitting a legacy PDCCH with respect to a TTI (first symbol) positioned at a fore end of one subframe and it may be assumed that corresponding data and/or control information are transmitted in five symbols. On the other hand, it may be assumed that a UE is capable of transmitting data and/or control information all seven symbols without a punctured or rate-matched resource region with respect to a TTI (second slot) positioned at a rear end of one subframe.

Figure 8A:
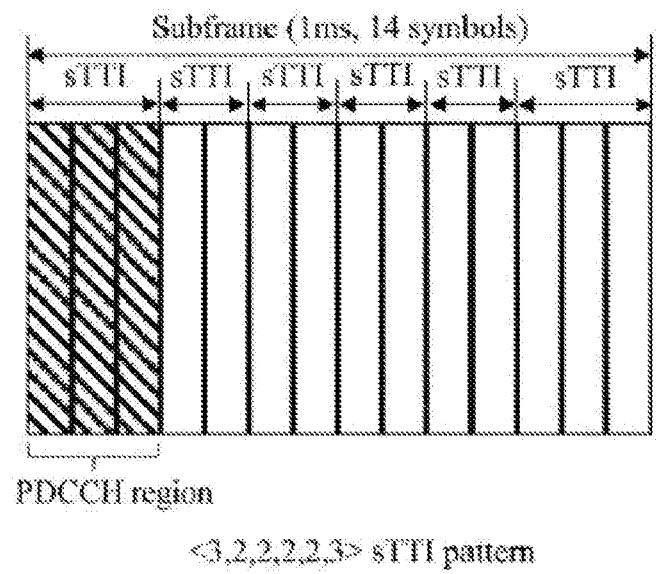
FIGS. 8A and 8B are diagrams showing a DL subframe structure including a short TTI including two or three symbols.
Figure 8B:
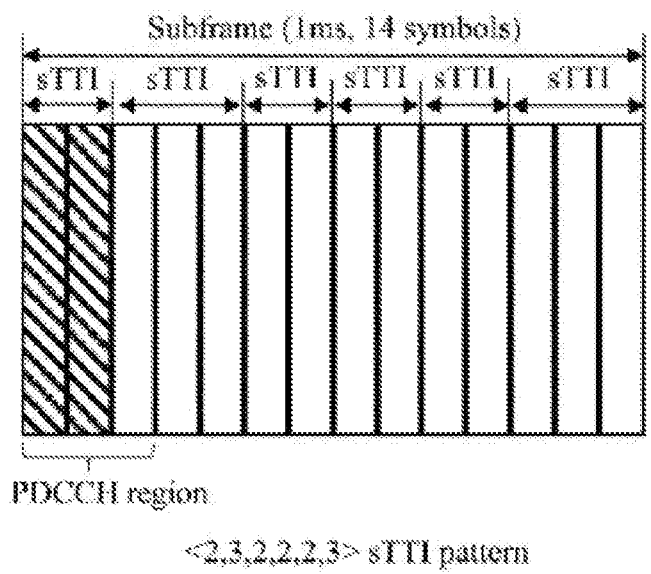

According to the present disclosure, a sTTI including two OFDM symbols (hereinafter, "OS") and a sTTI including three OSs may be considered to include sTTI structures that are combined and present in one subframe, as shown in FIGS. 8A and 8B. The sTTI including 2-OS or 3-OS sTTIs may be simply defined as 2-symbol sTTI (i.e., 2-OS sTTI). Also, 2-symbol sTTI or 3-symbol sTTI may be simply referred to as 2-symbol TTI or 3-symbol TTI, respectively, and it is clear that these are TTIs shorter than the 1 ms TTI, which is the legacy TTI, which is the premise of the present disclosure. That is, in the specification, the term "TTI" is referred to instead of sTTI, the term TTI means the sTTI, and regardless of its name, what the present disclosure proposes is a communication scheme in a system composed of TTIs shorter than a legacy TTI.

Also, in this specification, numerology refers to defining a length of a TTI to be applied to the wireless communication system, a subcarrier interval and the like, or a parameter or a communication structure or system based on the parameter such as the defined length of the TTI or sub-carrier spacing.

As shown in FIG. 8A, a sPDCCH may also be transmitted depending on the number of symbols of a PDCCH in a <3,2,2,2,2,3> sTTI pattern. In a <2,3,2,2,2,3> sTTI pattern of FIG. 8B, it may be difficult to transmit an sPDCCH due to a legacy PDCCH region.

UL Transmission with Repetition

A next-generation system (e.g., 5G new radio access technology (RAT)) aims at using a wider frequency band and supporting various services and requirements. As an example, ultra-reliable low-latency communication (URLLC), which is one of representative scenarios of new RAT (NR) requirements of 3GPP, requires low-latency and ultra-reliability having a user-plane latency of 0.5 ms and X-byte data transmission within 1 ms at an error rate of $10^{\wedge}-5$ or less. Generally, enhanced mobile broadband (eMBB) has a large traffic capacity, whereas URLLC traffic has a file size within a few tens to a few hundred bytes and is sporadic. Thus, the eMBB and URLLC have different characteristics. Therefore, transmission for maximizing transmission rate and minimizing control information overhead is required for eMBB and transmission having a short scheduling time unit and reliability is required for URLLC.

A variety of reference time units may be assumed/used for transmission and reception of physical channels according to an application field or a traffic type. The reference time unit may be a basic unit for scheduling a specific physical channel and may vary with the number of symbols constituting the scheduling unit and/or with a subcarrier spacing (SCS).

In an embodiment of the present disclosure, a slot and a mini-slot are described as the reference time unit, for convenience of description. The slot may be, for example, a basic scheduling unit used for normal data traffic (e.g. eMBB). The mini-slot may be a shorter time duration than the slot in the time domain and may be a basic scheduling unit used in traffic or communication schemes for a more special purpose (e.g. in URLLC, unlicensed bands, or millimeter wave). However, the above examples are purely exemplary and embodiments of the present disclosure may be applied even to the case in which eMBB transmits and receives a physical channel based on the mini-slot or the case in which URLLC or other communication schemes transmit and receive the physical channel based on the slot.

[Proposal 1] UL Collision with Repetition

In transmission for a service such as URLLC, or traffic requiring stricter block error rate (BLER)/latency/reliability, repetition in the time domain may be considered. For example, repetition in units of a TTI/slot/symbol may be applied to a corresponding channel for the purpose of higher reliability (and/or lower latency) of a specific transport block (TB)/code block (CB) (or CB group). Such repetition may be applied to semi-persistence scheduling (SPS) transmission or to PDCCH-less transmission similar to SPS transmission. The repetition may be a type similar to TTI bundling or may be applied in the form of repetition transmission of a grant-free UL channel where a UL channel is transmitted on a resource preconfigured through a higher-layer signal considered in the NR system.

[Proposal 1-1]

If repetition in units of a TTI/slot/symbol is configured/indicated for a specific TB/CB (group), it may be natural to maintain transmission power of a UE during repetition. Otherwise, an undesirable power transition period may be generated during repetition and there may be restrictions on DMRS bundling/sharing between a plurality of TTIs/slots due to the power transient period when it is desired to perform DMRS bundling/sharing for the purpose of reducing DMRS overhead. However, the UE may be faced with a carrier aggregation (CA) situation, or a power-limited situation in a partial TTI/slot/symbol during repetition as in PUSCH/PUCCH simultaneous transmission. Thereby, a situation in which transmission power of the UE inevitably needs to be changed may occur. In this situation, the following UE behaviors are proposed.

Option 1: The UE maintains the same power in all TTIs/slots/symbols in which repetition transmission is performed. Herein, in allocating power in the other TTIs/slots/symbols, a scheme different from an existing power allocation rule needs to be applied. As an example, during PUSCH/PUCCH simultaneous transmission, power is generally first allocated to a PUCCH and the remaining power is allocated to a PUSCH. According to Option 1, a rule may be defined such that power is first allocated to the PUSCH for which repetition is performed and the remaining power is allocated to the PUCCH.

Option 2: The UE may terminate a repetition operation upon occurrence of a TTI/slot/symbol in which power needs to be changed during repetition. Alternatively, the UE may skip the repetition operation in the corresponding TTI/slot/symbol and then resume repetition.

Option 3: Power change may be permitted in units of a time duration to which DMRS bundling/sharing is to be applied. More specifically, when it is necessary to change power in the first TTI in the time duration to which DMRS bundling/sharing is to be applied, power change may be permitted. However, when it is necessary to change power in a middle TTI rather than the first TTI in the time duration to which DMRS bundling/sharing is to be applied, a rule may be defined such that a channel for which repetition is performed is dropped or a rule may be defined such that power is maintained and a power allocation scheme different from the existing rule is applied as described in Option 1. The channel for which repetition is performed may be dropped only in a TTI in which power needs to be changed within a time duration to which DMRS bundling/sharing is to be applied or may be dropped in all TTIs within the time duration after the TTI in which power needs to be changed within the time duration to which DMRS bundling/sharing is to be applied. Alternatively, the channel for which repetition is performed may be dropped in all TTIs until repetition terminated after the TTI in which power needs to be changed within the time duration to which DMRS bundling/sharing is to be applied.

To reduce delay of a UL data channel caused by a scheduling request (SR) and scheduling delay, SPS-based UL transmission or grant-free-based or TTI bundling-based UL transmission may be considered. This may also be a method capable of reducing control overhead (e.g., control channel overhead). For traffic transmission requiring a service, such as URLLC, or stricter BLER/latency/reliability, repetition may also be considered. The operation of the option 1/2 may also be applied to SPS-based or grant-free-based UL repetition transmission.

[Proposal 1-2]

If repetition in units of a TTI/slot/symbol is configured/indicated for a specific TB/CB (group), a rule may be defined such that a network provides information regarding a time duration to which DMRS bundling/sharing is to be applied to the UE in units of a TTI/slot/symbol. Specifically, the network may allocate a different RS scrambling ID per time duration to which DMRS bundling/sharing is to be applied, provide information regarding phase continuity through DCI, or semi-statically preconfigure the time duration to which DMRS bundling/sharing is to be applied (e.g., through RRC signaling).

[Proposal 1-3]

In SPS-based or grant-free-based UL transmission, since UL grant DCI for scheduling each individual channel is not present, TPC update may be performed through group-common DCI (e.g., DCI format 3/3A in LTE) for the purpose of closed-loop power adjustment for SPS-based or grant-free-based UL transmission. If repetition is configured/indicated for SPS-based UL transmission or grant-free-based or TTI bundling-based UL transmission, a TPC update operation needs to be defined.

As an example, a situation in which a rule is defined such that TPC information is transmitted in an {i-K_PUSCH}-th TTI and the UE applies the TPC information to an i-th TTI is assumed. When the i-th TTI is a TTI located in the middle of repetition for a specific TB/CB (group), a rule may be defined such that TPC update (e.g., application of the TPC information) is not applied to all TTIs/slots/symbols in which repetition is performed. In this case, TPC update according to the TPC information may be applied to TTIs starting from a TTI corresponding to the first transmission opportunity after repetition. As another method, if TPC update is applied to a specific TTI in the middle of repetition, a rule may be defined such that DMRS bundling/sharing is not applied between the TTI to which TPC update is applied and TTIs before the TPC update is applied.

[Proposal 1-4]

In SPS-based or grant-free-based UL transmission, a HARQ process ID for initial transmission may be determined by a TTI index.

As an example, in LTE, the HARQ process ID for initial transmission is determined by Equation 1 below.

$$\text{HARQ process ID} = [\text{floor}\{\text{CURRENT\_TTI}/\text{semiPersistentSchedIntervalUL}\}] \text{ modulo numberOfConfUlSPS\_Processes} \quad \text{[Equation 1]}$$

In Equation 1, CURRENT_TTI is defined as CURRENT_TTI=[(SFN*10)+subframe number] and may indicate a TTI in which first transmission is performed. A parameter semiPersistentSchedIntervalUL may represent an interval of UL SPS transmission, floor{X} may represent a maximum integer not exceeding X, and a parameter numberOfConfUlSPS_Processes may represent the number of UL SPS processes configured for the UE.

If repetition is configured/indicated for SPS-based UL transmission or grant-free-based or TTI bundling-based UL transmission, a rule may be defined such that the HARQ process ID for initial transmission is determined by a specific TTI index included in a repetition chunk (e.g., an index of the first TTI in the repetition chunk).

In this case, when transmission in a corresponding TTI included in the repetition chunk (e.g., transmission in a TTI which is a basis for determining the HARQ process ID) is dropped by dynamic scheduling (e.g., non-SPS DCI) or traffic/channel etc. having a higher priority, a method of determining the HARQ process ID for repetition for SPS-based UL transmission or grant-free-based or TTI bundling-based UL transmission is proposed as follows.

Option 1: A rule may be defined such that the HARQ process ID is calculated by a specific TTI index of the repetition chunk (e.g., an index of the first TTI in the repetition chunk), regardless of whether transmission/drop is actually performed in a corresponding TTI.

Option 2: A rule may be defined such that the HARQ process ID is calculated by an index of a TTI in which transmission is actually performed. As an example, the HARQ process ID may be determined by an index of the first TTI in which transmission is not dropped among TTIs in the repetition chunk.

[Proposal 1-5]

If repetition is configured/indicated for UL transmission for a specific TB/CB (group), an open-loop power control (OLPC) parameter (e.g., P_O or alpha) and/or an incremented or decremented value which is predefined for TPC accumulation may be differently configured according to the number of repetitions of PUSCH/PUCCH transmission.

For example, the UE may determine final transmission power by applying a different OLPC parameter according to a configured/indicated number of repetitions. As another example, the UE may interpret a specific TPC command as a different value according to the configured/indicated number of repetitions.

[Proposal 1-6]

In TDD, the number of consecutive DL or UL TTIs may be less than a configured/indicated number of repetitions. In this case, if the UE waits until the next transmission opportunity of the same direction is offered, since latency may increase, this may be undesirable when strict latency requirements are demanded. In the case of dynamic scheduling-based repetition, the eNB may adjust the number of repetitions from the beginning. However, in the case of semi-static-based repetition, it may be difficult to freely adjust the number of repetitions. Accordingly, if a TTI of a direction different from a specific direction is present in the middle of repetition for transmission in the specific direction (e.g., DL or UL), a rule may be defined such that repetition is stopped. In this case, since only transmission of a smaller number than the number of repetitions necessary to satisfy specific reliability requirements may be performed, if the number of consecutive DL or UL TTIs is less than a configured/indicated number of repetitions, a rule may be defined such that a larger OLPC parameter (e.g., P_O or alpha) is applied to repetition transmission. An additional incremented or decremented value for TPC accumulation may be defined for the case in which the number of consecutive DL or UL TTIs is less than a configured/indicated number of repetitions.

As another method, if TTI(s) of a direction different from a specific direction are present in the middle of repetition for transmission in the specific direction (DL or UL), a rule may be defined such that whether to continue to perform repetition or stop repetition is determined by determining whether a gap generated by the TTI(s) is within a coherence time which is sufficient to apply DMRS bundling/sharing. As an example, if it is determined that performance may be degraded when DMRS bundling is performed due to the gap caused by TTIs of different directions, the UE may stop repetition and, if not, the UE may continue to perform repetition. A maximum gap which is a criterion for determination may be predefined in units of a TTI/slot/symbol or may be configured/indicated through a higher layer signal or a physical layer signal.

[Proposal 1-7]

To raise UL channel estimation performance, repetition of sounding reference signal (SRS) transmission may be considered. In particular, the network may trigger repetition transmission of an SRS through one DCI. At least one of information regarding the number of SRS repetitions, a TTI/slot/symbol in which SRS transmission is started, a TTI/slot/symbol in which SRS transmission is terminated, a length to be repeated from an SRS transmission start timing, and SRS transmission bandwidth may be predefined or may be configured/indicated through a higher/physical layer signal.

In more particular, while the SRS is repeatedly transmitted, an SRS transmission resource may be differently determined on a TTI/slot/symbol basis on the frequency axis according to a pattern which is predefined or is configured/indicated through a higher/physical layer signal. This enables SRS transmission on a wider frequency resource.

When SRS repetition transmission is supported, an OLPC parameter (e.g., P_O or alpha) for the SRS and/or an incremented/decremented value predefined for TPC accumulation may be differently configured according to the number of SRS repetitions and/or SRS transmission bandwidth (i.e., the number of RBs). In addition, when SRS repetition transmission is supported, a P_SRS_offset value may be differently configured according to the number of SRS repetitions and/or SRS transmission bandwidth (i.e., the number of RBs).

[Proposal 1-8]

When repetition in units of TTIs/slots/symbols is configured for a PUCCH, a situation in which an additional HARQ-ACK (or CSI) is transmitted or in which a PUSCH is triggered/scheduled (for a UE that cannot perform PUCCH/PUSCH simultaneous transmission), in the middle of repetition, may be considered. If the above operation is not permitted, DL data transmission that requires HARQ-ACK transmission at a timing in the middle of PUCCH repetition is impossible, this may not be desirable.

Option 1: If UCI should be additionally transmitted during PUCCH repetition, a PUCCH format may be differently switched according to payload. In particular, information regarding an OLPC parameter (e.g., P_O or alpha) and/or an incremented/decremented value predefined for TPC accumulation, which is different from a parameter and/or a value in the case in which the UCI is not added, may be predefined or may be configured for the UE through a higher layer signal.

Option 2: Addition of the UCI may be optionally permitted and the UE may transmit the added UCI through the PUCCH. The added UCI may correspond to a target service, quality of service (QoS), BLER requirements, reliability requirements, latency requirements, TTI length, and/or numerology of a higher priority. In addition, addition of UCI corresponding to a high priority may first be permitted only in a situation in which addition of the UCI does not cause PUCCH format switching.

Option 3: If HARQ-ACK should be additionally transmitted during PUCCH repetition, HARQ-ACK bundling in the spatial/time/carrier/frequency domain may be applied to the added HARQ-ACK.

Option 4: If the UCI should be additionally transmitted during PUCCH repetition, whether the UCI is added may be determined according to an added UCI type. In particular, a rule may be defined such that HARQ-ACK is added to a specific TTI during PUCCH repetition and CSI is dropped without being added.

Option 5: If PUSCH scheduling is performed during PUCCH repetition, a rule may be defined such that the UE drops a PUCCH in a corresponding TTI and piggybacks, on a PUSCH, UCI carried on the PUCCH.

Whether the above options are applied may differ according to whether transmission power of the PUCCH is changed (whether power is less than a threshold value which is predefined or is configured/indicated through a higher/physical layer signal). As an example, if PUCCH transmission power needs to be changed by a predetermined level or more, additional UCI transmission is not permitted and only PUCCH repetition may be performed.

[Proposal 1-9]

The UE may report information about capabilities of the UE indicating whether the UE can receive a plurality of (unicast) PDSCHs having the same TTI length and/or numerology at the same timing to the eNB. In particular, the plural PDSCHs may have different target services, QoS, BLER requirements, reliability requirements, and/or latency requirements. In this case, the UE should be capable of receiving/storing the PDSCHs in different buffers and demodulating/decoding the PDSCHs. This operation may be restrictively supported in that a total sum of TB sizes of the plural PDSCHs should be less than or equal to a maximum supportable TB size of the UE. To support this operation, another restriction in that a total sum of layers for the plural PDSCHs should be less than or equal to the maximum number of spatial layers originally supportable by the UE may be needed. The eNB may signal a higher layer signal for this operation to the UE.

[Proposal 1-10]

When repetition is configured/indicated for SPS-based UL transmission or grant-free-based or TTI bundling-based UL transmission (e.g., PUSCH), if transmission corresponding to repetition overlaps with an SPS-based initial transmission timing or a grant-free-based or TTI bundling-based initial transmission timing, a rule may be defined such that a higher priority is assigned to transmission corresponding to repetition, and SPS-based initial transmission or grant-free-based or TTI bundling-based initial transmission is dropped or a lower priority is assigned thereto during power allocation. In this case, a rule may be defined such that the dropped SPS-based initial transmission or grant-free-based or TTI bundling-based initial transmission is performed in the next SPS transmission opportunity.

In the case of an SPS PUSCH for example, the BS may transmit an SPS configuration, including an SPS interval (e.g., period) and parameters related to SPS PUSCH repetition transmission, to the UE through higher layer signaling (e.g., RRC signaling). The parameters related to SPS PUSCH repetition transmission may include, for example, the number of repetitions of transmission. The SPS PUSCH may have a short TTI (STTI) (e.g., slot or sub-slot) length or a normal TTI (e.g., subframe) length. Resources for the SPS PUSCH may be allocated through DCI scrambled with an SPS C-RNTI. The UE may receive the DCI scrambled with the SPS C-RNTI through a PDCCH from the BS and then repeatedly transmit the SPS PUSCH as many times as the number of repetitions of transmission indicated through a higher layer signal. As a specific example, assuming that the SPS interval and the number of repetitions of transmission, indicated through the SPS configuration, are K and N, respectively, the UE may repeatedly transmit the SPS PUSCH N times starting from the SPS interval n and then repeatedly transmit the SPS PUSCH N times starting from the SPS interval n+K. The SPS PUSCH transmitted in the SPS interval n and the SPS PUSCH transmitted in the SPS interval n+K may carry different UL data. N time resources for the SPS PUSCH repeated N times in every SPS interval may be continuous.

In the middle of repeatedly transmitting the SPS PUSCH (for convenience, referred to as SPS PUSCH 1), if the UE should transmit another SPS PUSCH (for convenience, referred to as SPS PUSCH 2), problems may occur. For example, there may be a problem that ongoing repetition transmission of SPS PUSCH 1 and SPS PUSCH 2 collide with each other (e.g., overlap in the same subframe/slot/sub-slot). In this case, the UE may continue to perform ongoing repetition transmission of SPS PUSCH 1 and may not transmit SPS PUSCH 2 (at least on a corresponding resource) (e.g., drop/latency of SPS PUSCH 2). Meanwhile, SPS PUSCH 2 may be related with DCI separately from DCI for SPS PUSCH 1. SPS PUSCH 2 may be a repeatedly transmitted SPS PUSCH and is not limited thereto, and SPS PUSCH 2 may be an SPS PUSCH which is not repeatedly transmitted. SPS PUSCH 2 may have an STTI length or a normal TTI length. The TTI length of SPS PUSCH 1 may be equal to the TTI length of SPS PUSCH 2. However, the TTI length of SPS PUSCH 1 may not always be equal to the TTI length of SPS PUSCH 2. For example, SPS PUSCH 1 may have the STTI length and SPS PUSCH 2 may have the normal TTI length or vice versa. In this case, collision on the same time resource between SPS PUSCH 1 and SPS PUSCH 2 may not always be limited to complete overlap between time resources and may include partial overlap between time resources.

In the above situation, the BS continues to repeatedly receive SPS PUSCH 1 from the UE. The eNB may expect that the UE will not transmit SPS PUSCH 2.

In this way, one technical meaning of assigning a high priority to ongoing SPS repetition may be as follows. If the BS preconfigures the number of SPS repetitions, this means that the target reliability of UL transmission may be secured only when SPS repetitions are performed as many times as the number of SPS repetitions. Therefore, it is necessary to guarantee UL SPS repetition transmission as many times as the number of SPS repetitions. If UL SPS repetition transmission as many times as the number of the SPS repetitions is not guaranteed, it may be difficult to guarantee the reliability of corresponding UL transmission.

While the above description has been given based on the SPS PUSCH for convenience, the present disclosure is not limited thereto and embodiments of the present disclosure may also be applied to other UL channels.

In particular, the above rule may be applied only when the number of repetitions is less than a predetermined number or only when the number of times of dropping SPS-based initial transmission or grant-free-based or TTI bundling-based initial transmission or reducing power, caused by transmission corresponding to repetition, is less than the predetermined number. For example, if the number of repetitions exceeds the predetermined number or if the number of times of dropping SPS-based initial transmission or grant-free-based or TTI bundling-based initial transmission or reducing power, caused by transmission corresponding to repetition, exceeds the predetermined number, a rule may be defined such that repetition is stopped and SPS-based initial transmission or grant-free-based or TTI bundling-based initial transmission is performed.

[Proposal 1-11]

When repetition is configured/indicated for SPS-based or grant-free-based UL transmission, if transmission corresponding to repetition overlaps with an SPS-based initial transmission timing or a grant-free-based or TTI bundling-based initial transmission timing, a rule may be defined such that repetition is immediately stopped and initial transmission is performed. That is, a higher priority may be given to latency rather than reliability of UL transmission.

[Proposal 1-12]

When repetition is configured/indicated for SPS-based or grant-free-based UL transmission, if transmission corresponding to repetition overlaps with an SPS-based initial transmission timing or a grant-free-based or TTI bundling-based initial transmission timing, both repetition transmission and initial transmission may be performed in the same TTI. This may serve to minimize degradation of both latency and reliability performance. If the UE performs both initial transmission and repetition transmission, respective coded symbols (e.g., modulation symbols) corresponding to initial transmission and repetition transmission may be mapped onto preallocated resources for SPS transmission. However, in this case, a total code rate may be increased and decoding performance may worsen.

Accordingly, the network may preconfigure or pre-reserve an additional resource for the UE through a higher layer signal so that other resources may be additionally used for a resource configured for SPS or grant-free or TTI bundling. In particular, if the added resource is separated from a preconfigured resource on the frequency axis, peak to average power ratio (PAPR) performance of the UE may be affected. Therefore, the added resource may be limited to be contiguously configured (or implicitly preset in advance) to the preconfigured resource.

As another method, the additional resource to be used in the above case may be preconfigured for the UE through a higher layer signal. When repetition is configured/indicated for SPS-based UL transmission or grant-free-based or TTI bundling-based UL transmission, if transmission corresponding to repetition overlaps with an SPS-based initial transmission timing or a grant-free-based or TTI bundling-based initial transmission timing, the UE may map both repetition transmission and initial transmission to the additionally configured resource.

As another method, UL transmission power used in the above case may be additionally preset or may be configured for the UE through a higher layer signal. As a specific example, an offset for UL transmission power which is to be applied to original repetition transmission and/or initial transmission may be preset or may be configured through the higher layer signal.

[Proposal 1-13]

When repetition is configured/indicated for SPS-based or grant-free-based UL transmission, the number of repetitions of transmission may be configured to be large such that repetition transmission of a current transmission opportunity may collide with the next transmission opportunity determined by an SPS/grant-free periodicity. As an example, an SPS periodicity may be one TTI and, simultaneously, 4 repetitions may be configured for each transmission. In LTE, a HARQ ID for current UL SPS initial transmission is determined as shown in Table 5 below.

TABLE 5 if the UE is not configured with short TTI in UL for the SpCell:
HARQ Process ID = [floor(CURRENT_TTI/semiPersistSchedIntervalUL)] modulo numberOfConfUlSPS-Processes,
where CURRENT_TTI=[(SFN * 10) + subframe number] and it refers to the subframe where the first transmission of a bundle takes place.
else, the HARQ Process ID associated with this TTI is derived from the following equation:
HARQ Process ID = [floor(CURRENT_TTI/semiPersistSchedIntervalUL-sTTI)] modulo numberOfConfUlSPS-Processes-sTTI,
where CURRENT_TTI = [(SFN * 10 * sTTI_Number_Per_Subframe) + subframe number * sTTI_Number_Per_Subframe + sTTI number] and it refers to the short TTI occasion where the first transmission of a bundle takes place. Refere to 5.10.2 for sTTI_Number_Per_Subframe and sTTI number.

According to an embodiment of the present disclosure, when repetition is configured/indicated for SPS-based or grant-free-based UL transmission, a rule may be defined such that the number of repetitions is also considered to determine the HARQ ID. For example, the HARQ ID may be determined as shown in Table 6 below.

TABLE 6 if the UE is not configured with short TTI in UL for the SpCell:
HARQ Process ID = [floor(CURRENT_TTI/max{semiPersistSchedIntervalUL, repetition number for SPS})] modulo numberOfConfUlSPS-Processes,
where CURRENT_TTI=[(SFN * 10) + subframe number] and it refers to the subframe where the first transmission of a bundle takes place.
else, the HARQ Process ID associated with this TTI is derived from the following equation:
HARQ Process ID = [floor(CURRENT_TTI/max{semiPersistSchedIntervalUL-sTTI, repetition number for SPS})] modulo numberOfConfUlSPS-Processes-sTTI,
where CURRENT_TTI = [(SFN * 10 * sTTI_Number_Per_Subframe) + subframe number * sTTI_Number_Per_Subframe + sTTI number] and it refers to the short TTI occasion where the first transmission of a bundle takes place. Refere to 5.10.2 for sTTI_Number_Per_Subframe and sTTI number.

The scheme of Table 6 may be effective as a method in which HARQ IDs of transmissions corresponding to repetition do not vary when repetition transmission is prioritized in a state in which an SPS/grant-free periodicity and the number of repetitions are configured such that the next transmission opportunity determined by the SPS/grant-free periodicity collides with repetition transmission.

[Proposal 1-14]

When repetition is configured/indicated for SPS-based or grant-free-based UL transmission, if a transmission timing of SPS-based or grant-free-based transmission corresponding to repetition (hereinafter, SPS-based or grant-free-based transmission corresponding to repetition will be referred to as UL SPS repetition transmission, for convenience of description) overlaps with a transmission timing of a dynamic UL grant-based UL channel (particularly, if collision caused by overlap between the transmission timings occurs in one serving cell), UL SPS repetition transmission corresponding to TTIs in which the timings overlap may be dropped and the dynamic UL grant-based UL channel may be transmitted. UL SPS repetition transmission, which should have been originally transmitted in TTIs after the TTIs in which the transmission timings overlap, may also be dropped or may be resumed.

Figure 9:
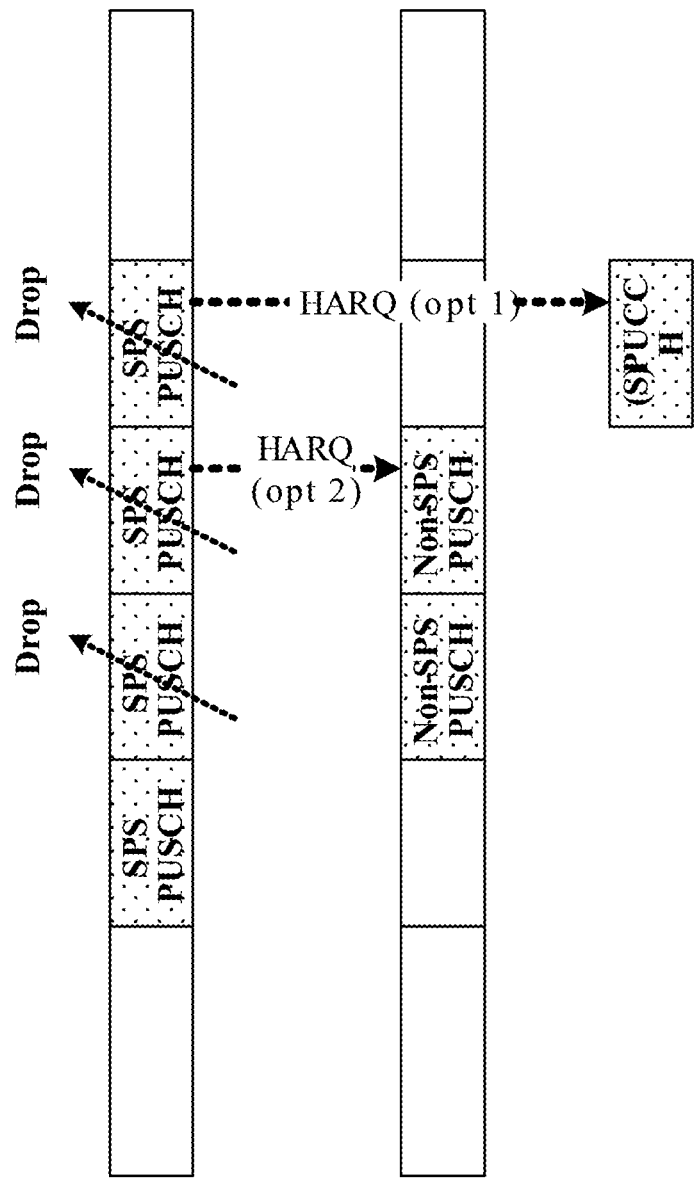
FIG. 9 is a diagram illustrating a method of transmitting piggyback UCI after dropping an SPS PUSCH according to an embodiment of the present disclosure.

FIG. 9 is a diagram illustrating a method of transmitting piggyback UCI after dropping an SPS PUSCH according to an embodiment of the present disclosure.

As the case in which UL SPS repetition transmission is dropped, when UCI (e.g., HARQ-ACK and/or CSI) which has been supposed to be transmitted by being piggybacked on UL SPS repetition transmission is present, a method of transmitting the UCI is proposed as follows. In the present proposal, although it is basically assumed that collision occurs in the same TTI length, collision may be extensively applied to collision in different TTI lengths.

Option 1: A rule may be defined such that the UCI (e.g., HARQ-ACK and/or CSI), which has been supposed to be transmitted by being piggybacked on UL SPS repetition transmission, is transmitted through a PUCCH. Characteristically, the method according to Option 1 may be applied only to the case in which a dynamic UL grant-based PUSCH is not scheduled in a corresponding TTI.

Option 2: A rule may be defined such that the UCI (e.g., HARQ-ACK and/or CSI), which has been supposed to be piggybacked on UL SPS repetition transmission, is transmitted through the dynamic UL grant-based PUSCH. Here, the dynamic UL grant-based PUSCH may be a PUSCH transmitted in the same serving cell as a serving cell in which the UCI has been supposed to be transmitted or may be scheduled in a serving cell different from the serving cell in which the UCI has been supposed to be transmitted.

[Proposal 1-15]

When repetition is configured/indicated for SPS-based or grant-free-based UL transmission, if the transmission timing of SPS-based or grant-free-based transmission corresponding to repetition (referred to as UL SPS repetition transmission, for convenience of description) overlaps with the transmission timing of the dynamic UL grant-based UL channel (particularly, if collision caused by overlap between the transmission timings occurs in one serving cell) and if UL SPS repetition transmission corresponds to a longer TTI, UL SPS repetition transmission corresponding to the longer TTI may be dropped and the dynamic UL grant-based UL channel may be transmitted (or vice versa). UL SPS repetition transmission, which should have been originally transmitted, may also be dropped or may be resumed in a TTI after the TTI in which the transmission timings overlap. If UL SPS repetition transmission is dropped, a method of transmitting the UCI (e.g., HARQ-ACK and/or CSI) which has been supposed to be transmitted by being piggybacked on UL SPS repetition transmission is proposed as follows.

Option 1: A rule may be defined such that the UCI (e.g., HARQ-ACK and/or CSI), which has been supposed to be transmitted by being piggybacked on UL SPS repetition transmission, is transmitted through the PUCCH. Characteristically, the method according to Option 1 may be applied only to the case in which the dynamic UL grant-based PUSCH is not scheduled in a corresponding TTI. Here, the PUCCH including the UCI may be equal to or shorter than a TTI length of dropped UL SPS repetition transmission.

Option 2: A rule may be defined such that the UCI (e.g., HARQ-ACK and/or CSI), which has been supposed to be transmitted by being piggybacked on UL SPS repetition transmission, is transmitted through the dynamic UL grant-based PUSCH. Here, the dynamic UL grant-based PUSCH may be the PUSCH transmitted in the same serving cell as a serving cell in which the UCI has been supposed to be transmitted or may be scheduled in a serving cell different from the serving cell in which the UCI has been supposed to be transmitted. The dynamic UL grant-based PUSCH including the UCI may be equal to or shorter than a TTI length of dropped UL SPS repetition transmission.

Since examples of the above-described proposed methods may also be included as one of implementation methods of the present disclosure, it is apparent that the examples may be regarded as the proposed methods. Further, while the above-described proposed methods may be implemented independently, the proposed methods may be implemented in the form of a combination (or aggregate) of some of the proposed methods. A rule may be defined such that information as to whether the proposed methods are applied (or information about the rules of the proposed methods) is indicated to a UE by a BS through a pre-defined signal (or a physical layer or higher layer signal).

Figure 10:
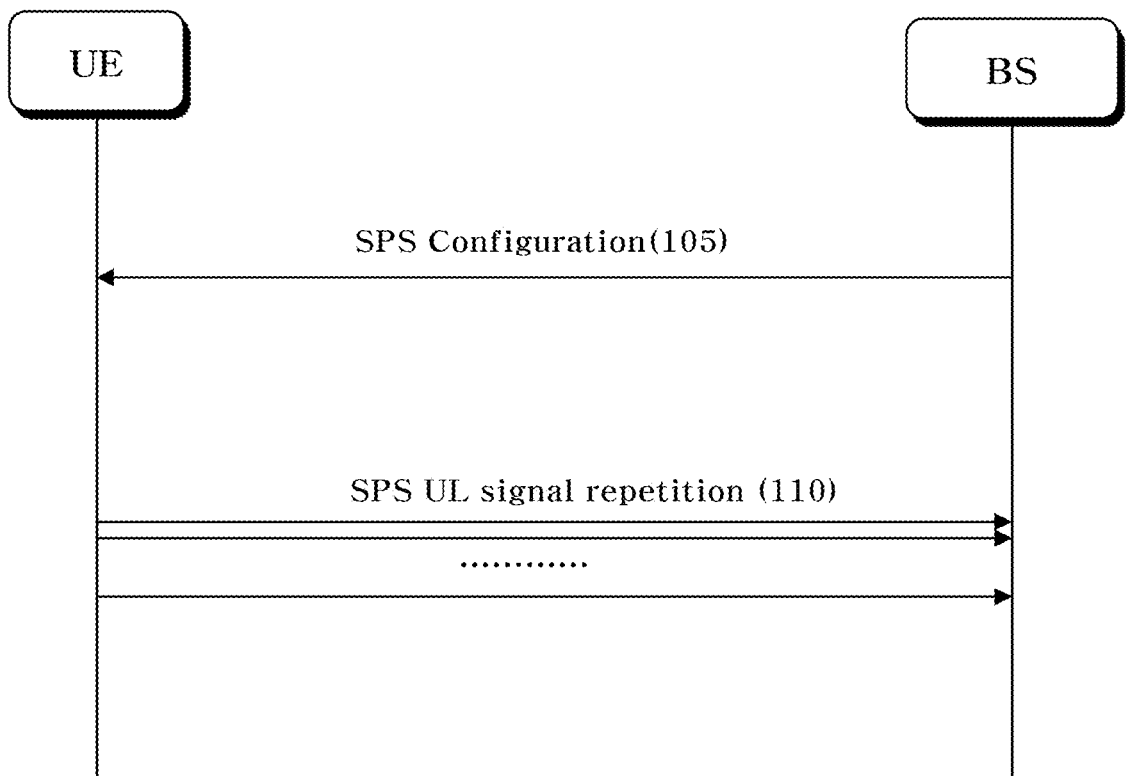
FIG. 10 is a flow of a transmission and reception method of a UL signal according to an embodiment of the present disclosure.

FIG. 10 is a flow of a transmission and reception method of a UL signal according to an embodiment of the present disclosure. FIG. 10 illustrates exemplary implementation of the above-described embodiments and the present disclosure is not limited to FIG. 10. A repeated part of the above description may be omitted.

Referring to FIG. 10, a UE may receive an SPS configuration for SPS-based UL signal repetition from a BS (105). For example, the SPS configuration may include information about an SPS interval (e.g., period) and information about the number of repetitions.

The UE repeatedly transmits a first SPS UL signal to the BS based on the SPS configuration (110). For example, the first SPS UL signal may be transmitted after the UE receives a PDCCH for SPS activation (not illustrated), where a CRC of the PDCCH is scrambled with an SPS C-RNTI.

When repetition of the first SPS UL signal is ongoing and a time resource of the first SPS UL signal overlaps with a time resource of a second SPS UL signal, the UE may continue to repeat the ongoing first SPS UL signal without transmitting the second SPS UL signal. Similarly, when repetition of the first SPS UL signal is ongoing and the time resource of the first SPS UL signal overlaps with the time resource of the second SPS UL signal, the BS may continue to receive repetition of the ongoing first SPS UL signal without receiving the second SPS UL signal. The second SPS UL signal may be scheduled through another PDCCH for SPS activation, where a CRC of the PDCCH is scrambled with the SPS C-RNTI.

The UE/BS may determine that the first SPS UL signal and the second SPS UL signal collide, in a state in which the time resource of the first SPS UL signal overlaps with the time resource of the second SPS UL signal. The BS may not expect that the UE will transmit the second SPS UL signal.

Each of the first SPS UL signal and the second SPS UL signal may be an SPS PUSCH.

Repetition of the first SPS UL signal may be performed in units of a subframe, a slot, or a sub-slot.

The second SPS UL signal may be related to initial transmission. For example, the second SPS UL signal may be initial transmission of a repeated SPS signal (i.e., prior to repetition start of the second SPS UL signal). Alternatively, the second SPS UL signal may be a normal SPS signal which is not repeated.

As an example, in a state in which the time resource of the first SPS UL signal overlaps with a time resource of a dynamic UL grant-based third UL signal rather than an SPS-based signal, the UE/BS may stop repeating the first SPS UL signal and transmit/receive the third UL signal. As an example, if repetition of the first SPS UL signal is stopped, the UE/BS may transmit/receive UCI, which has been supposed to be transmitted/received by being piggybacked on the first SPS UL signal, through the third UL signal or through an additional PUCCH.

Figure 11:
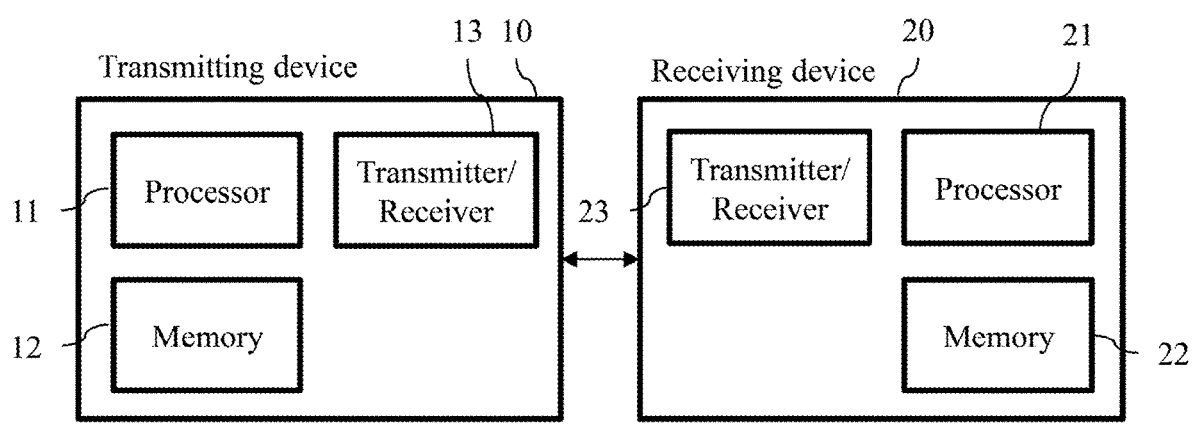
FIG. 11 is a block diagram showing an apparatus for embodying embodiment(s) of the present disclosure.

FIG. 11 is a block diagram illustrating a transmitting device 10 and a receiving device 20 configured to implement embodiments of the present disclosure. Each of the transmitting device 10 and receiving device 20 includes a transmitter/receiver 13, 23 capable of transmitting or receiving a radio signal that carries information and/or data, a signal, a message, etc., a memory 12, 22 configured to store various kinds of information related to communication with a wireless communication system, and a processor 11, 21 operatively connected to elements such as the transmitter/receiver 13, 23 and the memory 12, 22 to control the memory 12, 22 and/or the transmitter/receiver 13, 23 to allow the device to implement at least one of the embodiments of the present disclosure described above.

The memory 12, 22 may store a program for processing and controlling the processor 11, 21, and temporarily store input/output information. The memory 12, 22 may also be utilized as a buffer. The processor 11, 21 controls overall operations of various modules in the transmitting device or the receiving device. Particularly, the processor 11, 21 may perform various control functions for implementation of the present disclosure. The processors 11 and 21 may be referred to as controllers, microcontrollers, microprocessors, microcomputers, or the like. The processors 11 and 21 may be achieved by hardware, firmware, software, or a combination thereof. In a hardware configuration for an embodiment of the present disclosure, the processor 11, 21 may be provided with application specific integrated circuits (ASICs) or digital signal processors (DSPs), digital signal processing devices (DSPDs), programmable logic devices (PLDs), and field programmable gate arrays (FPGAs) that are configured to implement the present disclosure. In the case which the present disclosure is implemented using firmware or software, the firmware or software may be provided with a module, a procedure, a function, or the like which performs the functions or operations of the present disclosure. The firmware or software configured to implement the present disclosure may be provided in the processor 11, 21 or stored in the memory 12, 22 to be driven by the processor 11, 21.

The processor 11 of the transmitter 10 performs predetermined coding and modulation of a signal and/or data scheduled by the processor 11 or a scheduler connected to the processor 11, and then transmits a signal and/or data to the transmitter/receiver 13. For example, the processor 11 converts a data sequence to be transmitted into K layers through demultiplexing and channel coding, scrambling, and modulation. The coded data sequence is referred to as a codeword, and is equivalent to a transport block which is a data block provided by the MAC layer. One transport block is coded as one codeword, and each codeword is transmitted to the receiving device in the form of one or more layers. To perform frequency-up transformation, the transmitter/receiver 13 may include an oscillator. The transmitter/receiver 13 may include $N_t$ transmit antennas (wherein $N_t$ is a positive integer greater than or equal to 1).

The signal processing procedure in the receiving device 20 is configured as a reverse procedure of the signal processing procedure in the transmitting device 10. The transmitter/receiver 23 of the receiving device 20 receives a radio signal transmitted from the transmitting device 10 under control of the processor 21. The transmitter/receiver 23 may include $N_r$ receive antennas, and retrieves baseband signals by frequency down-converting the signals received through the receive antennas. The transmitter/receiver 23 may include an oscillator to perform frequency down-converting. The processor 21 may perform decoding and demodulation on the radio signal received through the receive antennas, thereby retrieving data that the transmitting device 10 has originally intended to transmit.

The transmitter/receiver 13, 23 includes one or more antennas. According to an embodiment of the present disclosure, the antennas function to transmit signals processed by the transmitter/receiver 13, 23 are to receive radio signals and deliver the same to the transmitter/receiver 13, 23. The antennas are also called antenna ports. Each antenna may correspond to one physical antenna or be configured by a combination of two or more physical antenna elements. A signal transmitted through each antenna cannot be decomposed by the receiving device 20 anymore. A reference signal (RS) transmitted in accordance with a corresponding antenna defines an antenna from the perspective of the receiving device 20, enables the receiving device 20 to perform channel estimation on the antenna irrespective of whether the channel is a single radio channel from one physical antenna or a composite channel from a plurality of physical antenna elements including the antenna. That is, an antenna is defined such that a channel for delivering a symbol on the antenna is derived from a channel for delivering another symbol on the same antenna. A transmitter/receiver supporting the Multiple-Input Multiple-Output (MIMO) for transmitting and receiving data using a plurality of antennas may be connected to two or more antennas.

In embodiments of the present disclosure, the UE or the terminal operates as the transmitting device 10 on uplink, and operates as the receiving device 20 on downlink. In embodiments of the present disclosure, the eNB or the base station operates as the receiving device 20 on uplink, and operates as the transmitting device 10 on downlink.

The transmitting device and/or the receiving device may perform a combination of at least one embodiment or two or more embodiments among the embodiments of the present disclosure.

Detailed descriptions of preferred embodiments of the present disclosure have been given to allow those skilled in the art to implement and practice the present disclosure. Although descriptions have been given of the preferred embodiments of the present disclosure, it will be apparent to those skilled in the art that various modifications and variations can be made in the present disclosure defined in the appended claims. Thus, the present disclosure is not intended to be limited to the embodiments described herein, but is intended to have the widest scope consistent with the principles and novel features disclosed herein.

The present disclosure can be used for such a wireless communication device as a terminal, a relay, a base station, and the like.

What is claimed is:

1. A method of transmitting an uplink signal by a user equipment in a wireless communication system, the method comprising:
   receiving a first semi-persistent scheduling (SPS) configuration for a first SPS-based physical uplink shared channel (PUSCH) wherein the first SPS configuration configures (i) a time duration of first SPS intervals of the first SPS-based PUSCH, and (iii) a number of repetitions of the first SPS-based PUSCH within each first SPS interval;
   receiving a second SPS configuration for a second SPS-based PUSCH, wherein the second SPS configuration configures a time duration of second SPS intervals of the second SPS-based PUSCH;
   based on the first SPS configuration, (i) performing an initial first SPS-based PUSCH transmission in a first SPS interval and (ii) performing repeated first SPS-based PUSCH transmissions based on the number of repetitions, wherein the repeated first SPS-based PUSCH transmissions comprise repeated transmissions of the first SPS-based PUSCH within the first SPS interval, and wherein the initial first SPS-based PUSCH transmission and the repeated first SPS-based PUSCH transmissions are sequentially located within the first SPS interval;
   determining whether the user equipment is scheduled to perform, in a second SPS interval, an initial second SPS-based PUSCH transmission that overlaps, in a time domain, with at least one of the repeated first SPS-based PUSCH transmissions which are ongoing in the first SPS interval; and
   based on a determination that the initial second SPS-based PUSCH transmission is scheduled to overlap with at least one of the repeated first SPS-based PUSCH transmissions, performing the ongoing repeated first SPS-based PUSCH transmissions without performing the initial second SPS-based PUSCH transmission.

2. The method according to claim 1, wherein the repeated first SPS-based PUSCH transmissions are performed over a plurality of time intervals (TTIs) based on the first SPS configuration.

3. The method according to claim 2, wherein each of the plurality of TTIs is one of (i) a subframe including 14 symbols in the time domain, (ii) a slot including 7 symbols in the time domain, or (iii) a subslot including N symbols in the time domain, where N is a positive integer smaller than 7.

4. The method according to claim 1, further comprising:
   receiving a dynamic uplink grant for a third uplink transmission which is not a SPS-based PUSCH transmission,
   wherein, based on a determination that at least one of the repeated first SPS-based PUSCH transmissions overlap, in the time domain, with the third uplink transmission based on the dynamic uplink grant: the user equipment stops performing the repeated first SPS-based PUSCH transmissions and performs the third uplink transmission.

5. The method according claim 4, wherein, based on the user equipment stopping the repeated first SPS-based PUSCH transmissions, the user equipment transmits, through the third uplink transmission or through a physical uplink control channel (PUCCH), uplink control information (UCI) which was to be transmitted through piggyback on the repeated first SPS-based PUSCH transmissions.

6. A method of receiving an uplink signal by a base station in a wireless communication system, the method comprising:
   transmitting, to a user equipment, a first semi-persistent scheduling (SPS) configuration for a first SPS-based physical uplink shared channel (PUSCH), wherein the first SPS configuration configures (i) a time duration of first SPS intervals of the first SPS-based PUSCH, and (ii) a number of repetitions of the first SPS-based PUSCH within each first SPS interval;
   transmitting, to the user equipment, a second SPS configuration for a second SPS-based PUSCH, wherein the second SPS configuration configures a time duration of second SPS intervals of the second SPS-based PUSCH; and
   based on the first SPS configuration, (i) receiving, from the user equipment, an initial first SPS-based PUSCH transmission in a first SPS interval and (ii) receiving, from the user equipment, repeated first SPS-based PUSCH transmissions based on the number of repetitions, wherein the repeated first SPS-based PUSCH transmissions comprise repeated transmissions of the first SPS-based PUSCH within the first SPS interval, and wherein the initial first SPS-based PUSCH transmission and the repeated first SPS-based PUSCH transmissions are sequentially located within the first SPS interval; and
   based on an initial second SPS-based PUSCH transmission scheduled in a second SPS interval to overlap, in a time domain, with at least one of the repeated first SPS-based PUSCH transmissions which are ongoing in the first SPS interval: receiving the ongoing repeated first SPS-based PUSCH transmissions without receiving the initial second SPS-based PUSCH transmission.

7. The method according to claim 6, wherein, based on the initial second SPS-based PUSCH transmission scheduled in the second SPS interval to overlap, in the time domain, with the at least one of the repeated transmissions of the first SPS-based PUSCH which are ongoing in the first SPS interval, the base station does not expect that the user equipment performs the initial second SPS-based PUSCH transmission.

8. The method according to claim 6, wherein the repeated first SPS-based PUSCH transmissions are received over a plurality of time intervals (TTIs) based on the first SPS configuration.

9. The method according to claim 8, wherein each of the plurality of TTIs is one of (i) a subframe including 14 symbols in the time domain, (ii) a slot including 7 symbols in the time domain, or (iii) a subslot including N symbols in the time domain, where N is a positive integer smaller than 7.

10. The method according to claim 6, further comprising:
    transmitting, to the user equipment, a dynamic uplink grant for a third uplink transmission which is not a SPS-based PUSCH transmission,
    wherein, based on at least one of the repeated first SPS-based PUSCH transmissions overlapping, in the time domain, with the third uplink transmission based on the dynamic uplink grant, the base station stops receiving the repeated first SPS-based PUSCH transmissions and receives the third uplink transmission.

11. The method according to claim 10, wherein, based on the base station stopping reception of the repeated first SPS-based PUSCH transmissions, the base station receives, through the third uplink transmission or through a physical uplink control channel (PUCCH), uplink control information (UCI) which was to be received through piggyback on the repeated first SPS-based PUSCH transmissions.

12. A user equipment configured to transmit an uplink signal in a wireless communication system, the user equipment comprising:
- a transceiver;
- at least one processor; and
- at least one computer memory that is operably connectable to the at least one processor and that stores instructions which, when executed, cause the at least one processor to perform operations comprising:
- receiving, via the transceiver, a first semi-persistent scheduling (SPS) configuration for a first SPS-based physical uplink shared channel (PUSCH) wherein the first SPS configuration configures (i) a time duration of first SPS intervals of the first SPS-based PUSCH, and (ii) a number of repetitions of the first SPS-based PUSCH within each first SPS interval;
- receiving, via the transceiver, a second SPS configuration for a second SPS-based PUSCH, wherein the second SPS configuration configures a time duration of second SPS intervals of the second SPS-based PUSCH;
- based on the first SPS configuration, (i) performing, via the transceiver, an initial first SPS-based PUSCH transmission in a first SPS interval and (ii) performing, via the transceiver, repeated first SPS-based PUSCH transmissions based on the number of repetitions, wherein the repeated first SPS-based PUSCH transmissions comprise repeated transmissions of the first SPS-based PUSCH within the first SPS interval, and wherein the initial first SPS-based PUSCH transmission and the repeated first SPS-based PUSCH transmissions are sequentially located within the first SPS interval;
- determining whether the user equipment is scheduled to perform, in a second SPS interval, an initial second SPS-based PUSCH transmission that overlaps, in a time domain, with at least one of the repeated first SPS-based PUSCH transmissions which are ongoing in the first SPS interval; and
- based on a determination that the initial second SPS-based PUSCH transmission is scheduled to overlap with at least one of the repeated first SPS-based PUSCH transmissions, performing the ongoing repeated first SPS-based PUSCH transmissions without performing the initial second SPS-based PUSCH transmission.

13. The user equipment according to claim 12, wherein the repeated first SPS-based PUSCH transmissions are performed over a plurality of time intervals (TTIs) based on the first SPS configuration.

14. The user equipment according to claim 13, wherein each of the plurality of TTIs is one of (i) a subframe including 14 symbols in the time domain, (ii) a slot including 7 symbols in the time domain, or (iii) a subslot including N symbols in the time domain, where N is a positive integer smaller than 7.

15. The user equipment according to claim 12, wherein the operations further comprise:
- receiving a dynamic uplink grant for a third uplink transmission which is not a SPS-based PUSCH transmission,
- wherein, based on a determination that at least one of the repeated first SPS-based PUSCH transmissions overlap, in the time domain, with the third uplink transmission based on the dynamic uplink grant: the user equipment stops performing the repeated first SPS-based PUSCH transmissions and performs the third uplink transmission.

\* \* \* \* \*